Aug. 17, 1965 D. H. SIMMONDS ETAL 3,201,794

APPARATUS FOR RECORDING DATA

Filed Nov. 21, 1961 6 Sheets-Sheet 5

3,201,794
APPARATUS FOR RECORDING DATA

David H. Simmonds, Brisbane, Queensland, and Robert J. Rowlands, North Balwyn, Victoria, Australia, assignors to The University of Adelaide, Adelaide, South Australia, Australia Filed Nov. 21, 1961, Ser. No. 153,974
Claims priority, application Australia, Nov. 24, 1960, 66,934/60
8 Claims. (Cl. 346—31)

This invention relates to apparatus for recording data which includes a print-out mechanism.

It is already known to convert angular rotational movement into a printed read-out, this being accomplished by a digitiser coupled to a decoder, and an automatic typewriter. In order to achieve high standards of accuracy and resolution however, the digitiser or coding section of the unit requires to be a highly precise and therefore an expensive piece of equipment. It has previously been considered necessary to use somewhat complex electronic circuitry to encode and decode the digital information.

The main object of this invention is to provide a means for recording data which is substantially simple but nevertheless accurate.

In its simplest form this invention may be said to consist of apparatus which includes a base, a print-out servo motor on the base, a receiving potentiometer on the base, speed reduction means mechanically coupling the moving arm of the receiving potentiometer to the print-out servo motor whereby the print-out servo motor drives the moving arm, signal amplifying means electrically coupling the receiving potentiometer to the print-out servo motor whereby servo motor operation is responsive to moving arm position, print-out mechanism movable on the base, data recording means movable on the base, the print-out mechanism including type members mechanically coupled to the servo motor, electrically controlled print-out operating means between the frame and the print-out mechanism operable to urge the print-out mechanism into contact with the data recording means, timing means electrically coupled to the print-out operating means, the timing means being operable to periodically energize the print-out operating means, and indexing means on the base operable to index the data recording means while the print-out operating means is de-energized.

The invention can be applied in any one of a number of fields which include colorimetry; densitometry; nephelometry; reflectance measurements; temperature, pressure or rainfall data; monitoring of liquids in tanks; volume measurement of gases or liquids, or the recording of any other data which can be converted to an electrical voltage or rotational motion.

However, the invention, to be fully understood, is necessarily described with reference to a particular application, and an embodiment is described hereunder wherein the invention is applied to apparatus for determining the amino acids from protein material which are thrown out sequentially in test apparatus.

Figure 1:
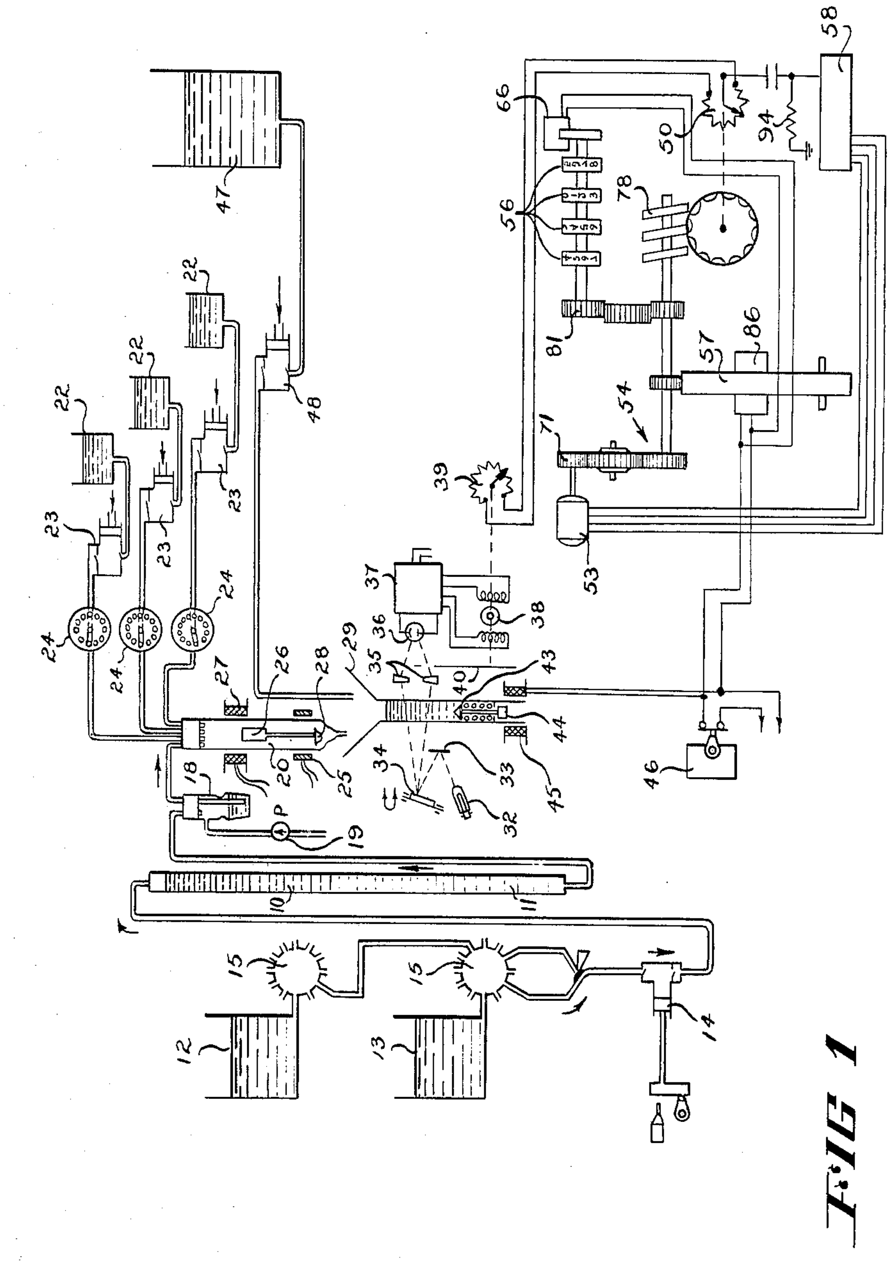
Figure 2:
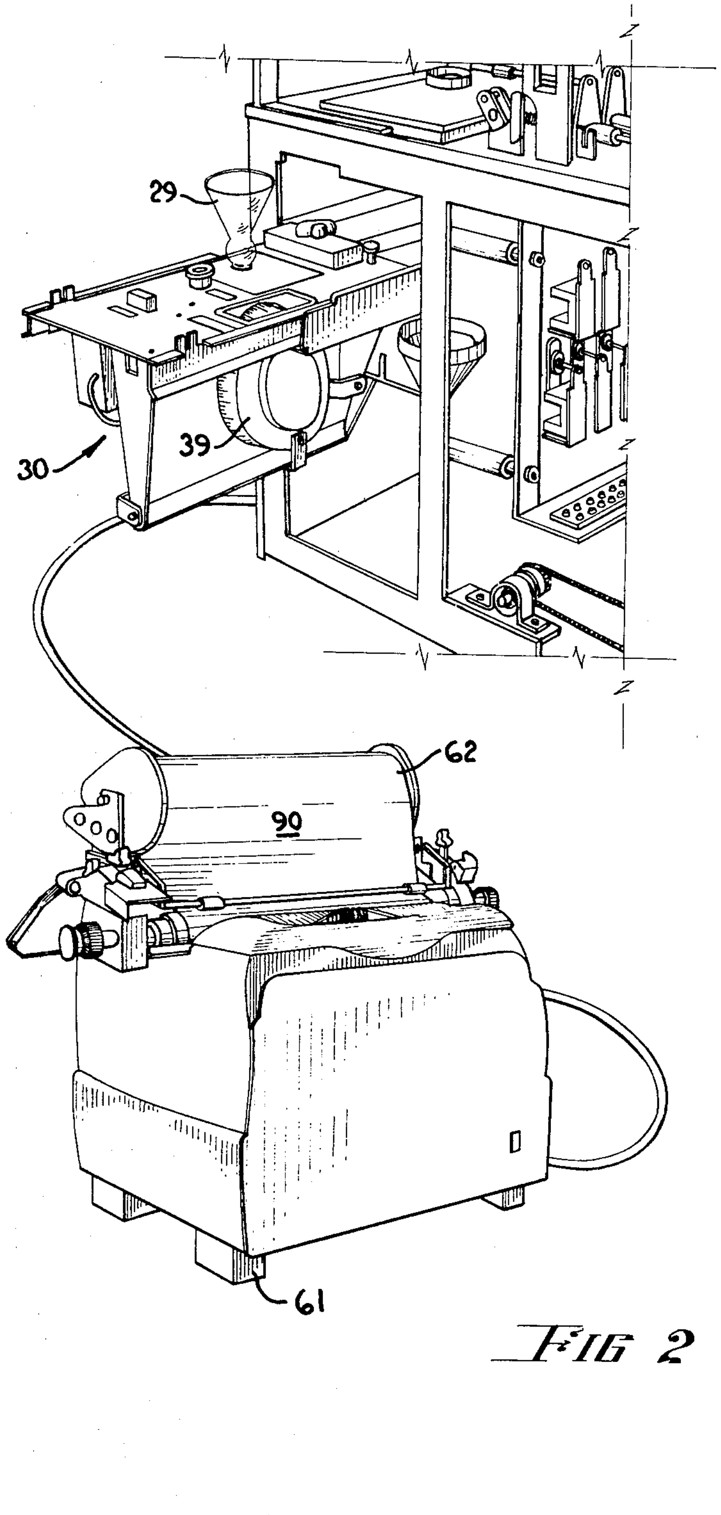
Figure 3:
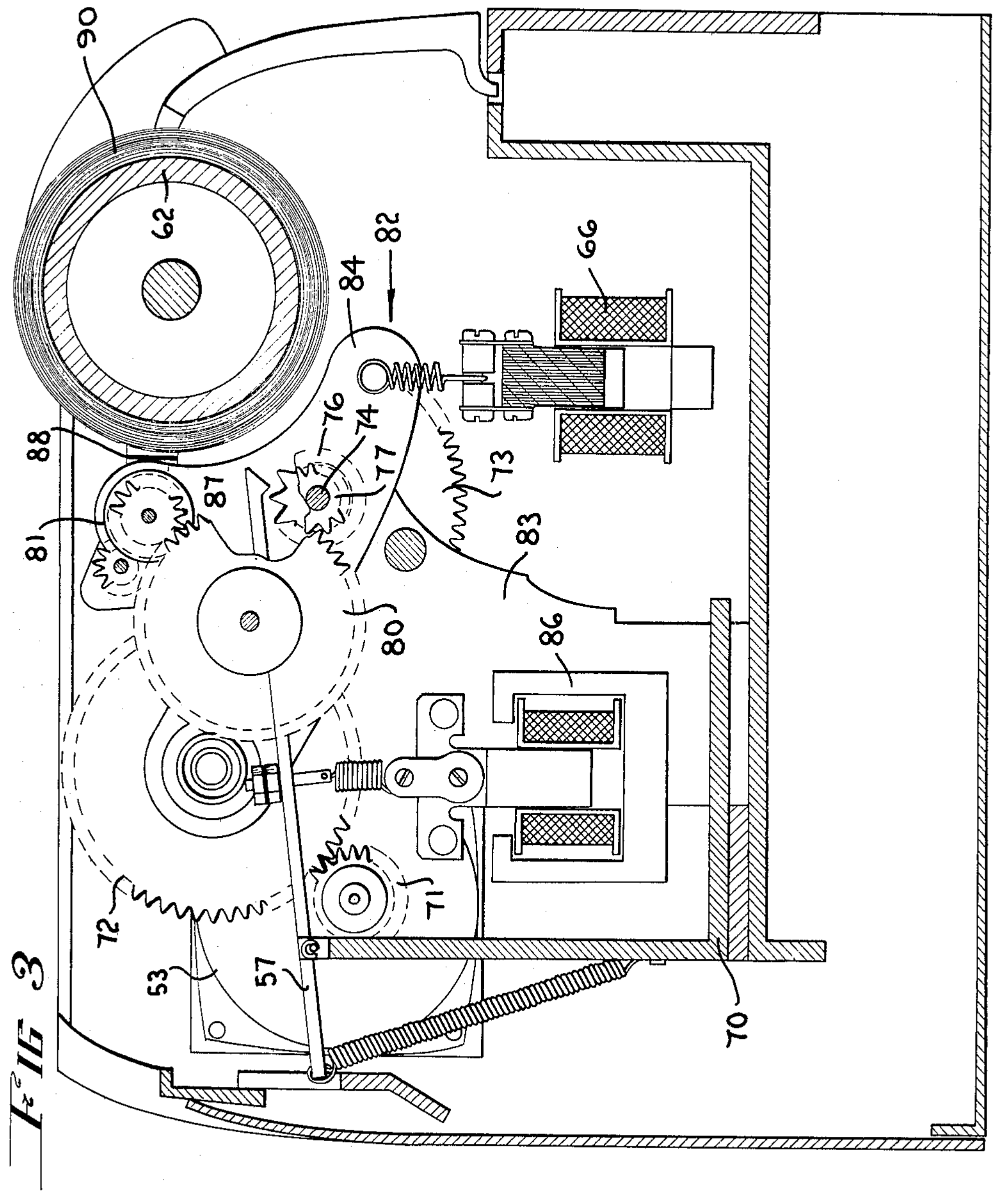
Figure 4:
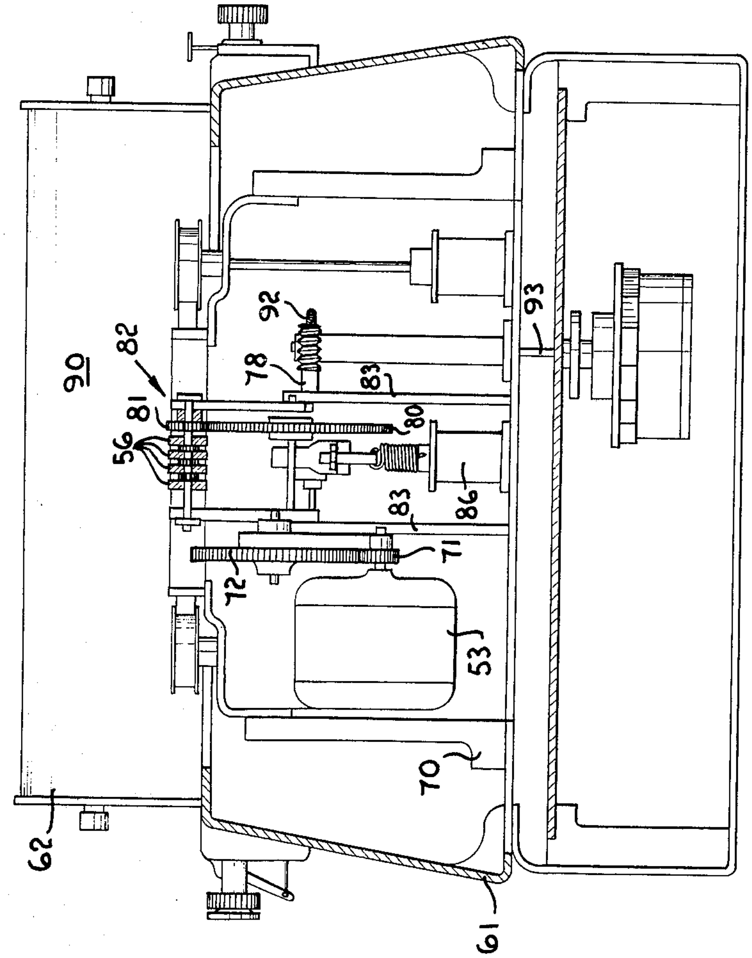
Figure 5:
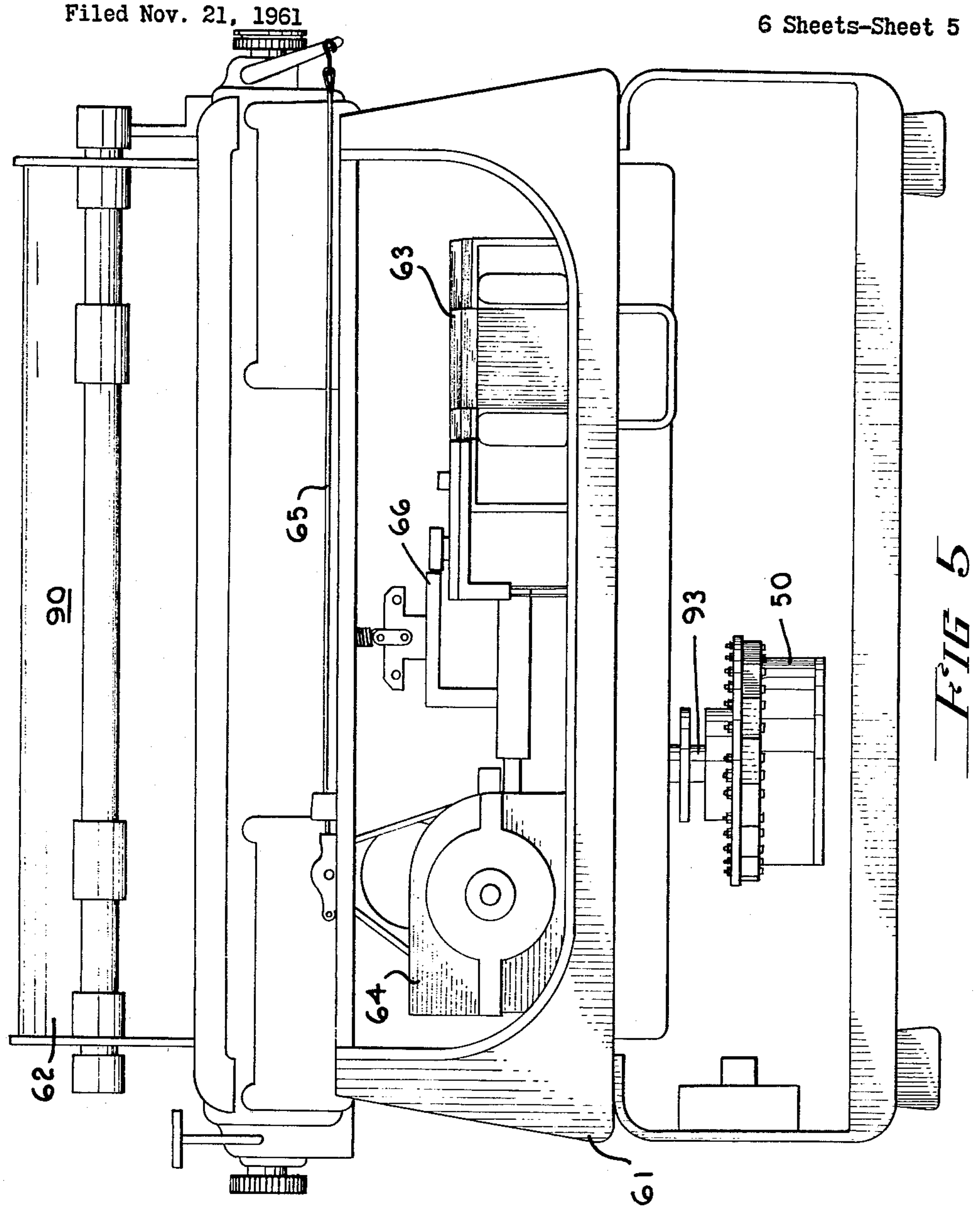
Figure 6:
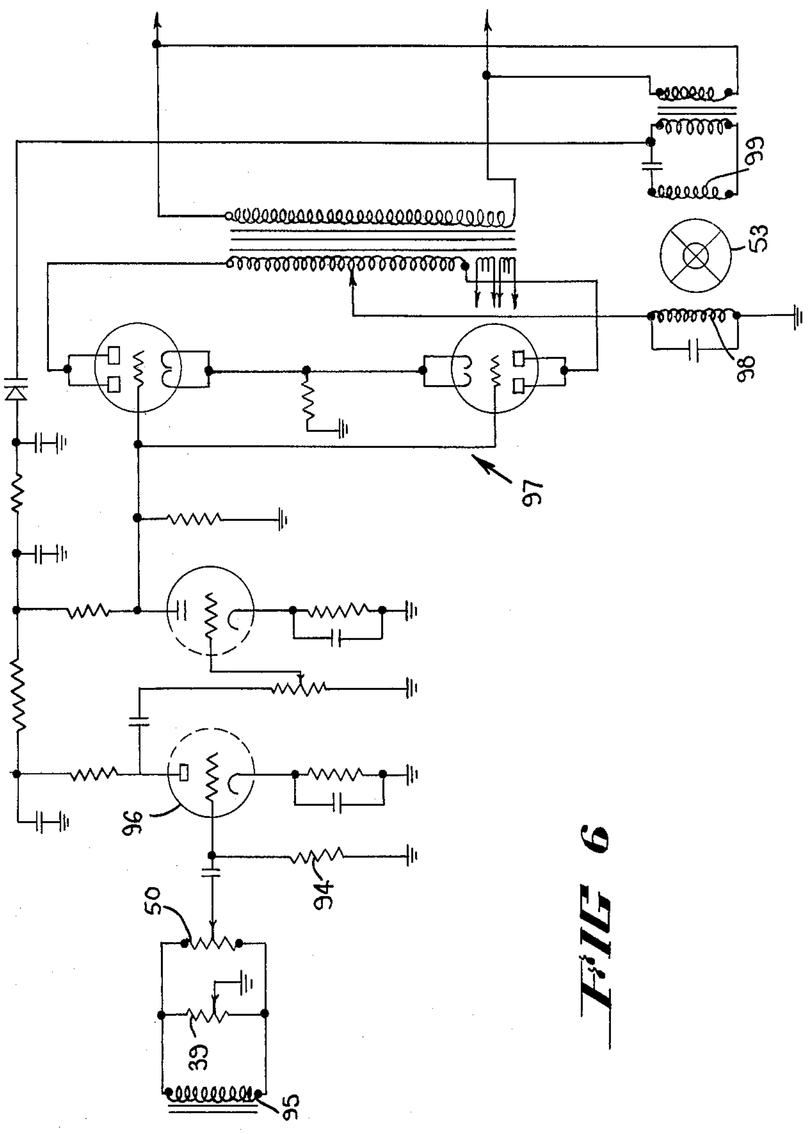

The embodiment which is described herein is described with reference to and is illustrated in the accompanying drawings, in which:

FIG. 1 is a block diagram showing schematically the chemical apparatus and also the apparatus for recording data, FIG. 2 shows schematically the physical interconnection of the apparatus for recording data with an ultra-photometer, FIG. 3 is a cross-section through the apparatus for recording data, FIG. 4 is a front view of same, partly sectioned, FIG. 5 is a rear view of same with dust covers removed, and FIG. 6 is an electrical circuit of the receiving potentiometer, the signal amplifying means and the print-out servo motor used in the apparatus.

Referring first to FIG. 1, a column 10 includes an ion exchange resin 11 (Dowex 50/X8), manufactured by Dow Chemical Company, Midland, Michigan, U.S.A. through which a buffer solution is pumped. The buffer solution comes either from the buffer reservoir 12, or as shown, from the buffer reservoir 13, being pumped from the reservoir by means of the adjustable throw pump 14. In this embodiment there are nine columns 10 and nine pumps 14, and the buffer solution is directed through a manifold 15 to each of the nine columns 10 in turn. The buffer reservoir 12 is the first reservoir used and contains a liquid of pH 3.25, and when this has been exhausted, the reservoir 13 is then used, this containing a buffer liquid of pH 4.25, and while this is being used the reservoir 12 is refilled with a buffer solution of pH 5.25, this being the final buffer solution pumped through the column 10. These pH values need to be varied in this way in order to ensure that the amino acids all come out from the test protein. The pump 14 displaces liquid from the column 10 into the collecting vessel 18, and after a predetermined period of time, which is in this embodiment ten minutes, the air pump 19 blows the liquid outwardly from the collecting vessel 18 and into the heating and mixing vessel 20. The heating and mixing vessel 20 also receives a ninhydren reagent from one of the reagent vessels 22 which is pumped by a pump 23 through a selector valve 24. The reagent mixes with the contents of the collecting vessel 18 within the mixing vessel 20, and lies in the bottom of the vessel 20 where it is warmed by the heating element 25. The vessel 20 has within it an armature 26 which is excited by a coil 27 periodically, and when excited lifts a valve 28 from the base of the vessel 20 to discharge into a transparent vessel 29. The liquids mixed in the vessel 20 assume a colour the intensity of which is a function of the amino acid present.

The transparent vessel 29 forms an element of a "Sigrist ultra-photometer 30 type UP2LD" (manufactured by Sigrist-Weiss, Falkenstrasse 23, Zurich 1/8, Switzerland) and this ultra-photometer includes a light source 32, a fixed mirror 33, a vibrating mirror 34, a pair of lenses 35, a photocell 36, an amplifier 37, a data servo motor 38, a transmitting potentiometer 39, and a light blanketing wedge 40. The function of the vibrating mirror 34 is to direct light intermittently through the transparent vessel 29, and to one side of the transparent vessel 29, the two beams of light converging because of the lenses 35 on the photocell 36 and the electrical signals generated by the photocell are separately amplified in the amplifier 37 which feeds the servo motor 38, the servo motor 38 being mechanically coupled to the wedge 40 and being so driven that the wedge 40 moves until the light beams emerging from the lenses 35 and entering the photocell 36 are of equal intensity, whereupon the servo motor 38 becomes electrically balanced and therefore stationary. The data servo motor 38 is mechanically coupled to the transmitting potentiometer 39, which in this embodiment is a linear potentiometer. Thus the setting of the transmitting potentiometer moving arm varies in accordance with the intensity of light passing through the vessel 29 and liquid contained therein.

The lower end of the transparent vessel 29 is closed by a spring loaded valve 43 on the end of the stem on which is disposed an armature 44 which is magnetically excited when the coil 45 is energized. This occurs in this embodiment once every one and one ninth minutes, and is under the control of a mechanically operated timer 46. When the valve 43 opens the contents of the transparent vessel 29 pass to waste, and the vessel 29 is washed out by alcohol from the alcohol reservoir 47 which is pumped out by means of the pump 48.

The windings of the transmitting potentiometer 39 are directly coupled electrically to the windings of a receiving potentiometer 50, which in this embodiment is an exponentially wound potentiometer, this being desirable to convert the linear readings of the "Sigrist" photometer which are in transmittance units logarithmically to the required absorbance units, the conversion taking place at this point since the print-out mechanism is necessarily linear in relation to its controlling rotational driving mechanism.

The apparatus for recording the data is shown schematically in FIG. 1, where a print-out servo motor 53 is coupled through a train of gears 54 to the moving arm of the receiving potentiometer 50 and also to a roller counter mechanism, the roller counter mechanism including four co-operating rollers 56, each of which is a type member and is engraved so that the figures stand out therefrom. Associated with the train of gears 54 is a pivoted lock arm 57 which prevents rotation of the gears 54 when the roller counter mechanism is moved to register data. The print-out servo motor 53 is not only mechanically coupled to the receiving potentiometer 50 but is electrically coupled thereto through the signal amplifier 58.

The apparatus for recording the data will now be considered by itself and in more detail.

A base 61 is formed from an electrical typewriter with the keyboard removed, and retains the platen 62 together with its various interconnections for indexing axially and rotationally. The typewriter used in this embodiment is that known under the trademark "Everest," model 92 electric carriage return, made by Messrs. Serio S.P.A., via Mellerio, Milan, Italy, but it is found that any or almost any electrical typewriter is suitable for conversion in this manner. The carriage return is effected by means of the typewriter motor 63 driving through the gear box 64 and co-operating with the spring loaded tape 65, while the axial indexing is achieved by means of the indexing solenoid 66 through the existing linkage gear of the typewriter.

The entire keyboard of the typewriter however is removed and is replaced by a sub-frame 70. The sub-frame 70 has the print-out servo motor 53 secured thereto, and the motor pinion 71 engages an idler gear 72 which in turn engages a countershaft gear 73 (see FIG. 3), the countershaft gear 73 being keyed to the countershaft 74. The countershaft 74 is disposed longitudinally in the sub-frame 70 and has on it a star wheel 76, a pinion 77 and a worm drive wheel 78. The pinion 77 engages a second idler 80 which in turn engages the pinion 81 driving the rollers 56. The rollers 56 are simply the rollers of a small unit counter as used in automobile trip mileage recorders, and interconnected with each other with gearing. The unit in this embodiment is a general purpose counter made by Veeder-Root Limited, Kilspindie Road, Dundee, Scotland. The engraved figures of the general purpose counter however are replaced by raised type.

The sub-frame 70 has on it a pair of spaced parallel arms 83, and the countershaft 74 forms an axle around which the print-out mechanism 82 moves, the print-out mechanism 82 including a pair of rocker arms 84 pivoted on the countershaft 74, the rocker arms 84 carrying the print-out rollers 56. These arms 84 also carry a second idler 80, so that the arms 84 can rock about the countershaft 74 without any gears disengaging.

A locking solenoid 86 is linked to the rotational lock arm 57, and when energized draws the toothed end 87 of the arm 57 into engagement with the star wheel 76 so that the print-out operation is effected with the type on each of the rollers 56 in alignment. The axial indexing solenoid 66 is linked to the arms 84 so that, upon energizing of the solenoid 66, the arms 84 rock about the countershaft 74, hence the solenoid 66 constitutes the print-out operating means. Both solenoids 66 and 86 are energized by the mechanically operated timer 46 whenever the coil 45 is energized. The solenoid 86 is also utilised to index the typewriter ribbon 88.

The platen 62 carries on it a roll of paper 90 extending for its full width. When the solenoid 66 is energized, the type carrying rollers 56 contact the paper 90 through the typewriter ribbon 88 thereby making a permanent mark on the paper 90. In this embodiment the platen 62 is arranged with a normal typewriter mechanism to index nine times axially before carriage return, and upon carriage return the platen 62 indexes rotationally, this however being the normal function of the typewriter. The platen and carriage arrangment constitute the data recording means.

As said above, the end of the countershaft 74 has on it a worm drive wheel 78 and this engages a worm wheel 92 which is on the upper end of the receiving potentiometer shaft 93, so that the receiving potentiometer 50 has its moving arm mechanically coupled to the servo motor 53 through the train of gears 54.

Referring now to the wiring diagram of FIG. 6, a transformer 95 feeds the receiving potentiometer 50, and the moving arm of the receiving potentiometer 50 couples to the control grid of the first half of the twin triode 96 (6SL7). Thus any unbalance between the potentiometer 39 and 50 causes current flow through bias resistor 94 and manifests itself as a grid bias on the first half of the twin triode 96, either positive or negative depending upon the relative positions of the wiper arms of the potentiometers, and this grid bias is amplified. The twin triode 96 is utilised as a two stage amplifier and its output is delivered to the push-pull output circuit 97 which inverses the phase through the coil 98 of the print-out servo motor 53, the coil 98 being balanced against the normally energized coil 99, this of course being a standard servo motor circuit. By this means any signal applied to the receiving potentiometer 50 is electrically coupled to the print-out servo motor 53.

From the above it will be seen that the invention provides a simple mechanism for the recording of data from the photometer, but it will also be appreciated that the device can record data from other equipment with the necessary modifications being made.

What we claim is:

1. Apparatus for recording data transmitted from an ultra-photometer responsive to the color density of each of a series of liquid samples pumped through the ultra-photometer in turn, including a base, a print-out servo motor on the base, a receiving potentiometer on the base, a transmitting potentiometer on the base, a data servo motor mechanically coupled for drive to the transmitting potentiometer, an electrical connection coupling the receiving and transmitting potentiometers, speed reduction means mechanically coupling the moving arm of the receiving potentiometer to the print-out servo motor whereby the print-out servo motor drives the moving arm of the receiving potentiometer, signal amplifying means electrically coupling the receiving potentiometer to the print-out servo motor whereby print-out servo-motor operation is responsive to unbalance between said potentiometers, print-out mcehanism movable on the base, data recording means movable on the base, the print-out mechanism including type members mcehanically coupled to the servo motor, solenoid controlled print-out operating means between the frame and the print-out mechanism operable to urge the print-out mechanism into contact with the data recording means, mechanically operated timing switch means electrically coupled to the print-out operating means, the timing switch means being operable to periodically energize the print-out operating means, and indexing means on the base operable to index the data recording means while the print-out operating means is de-energized.

2. Apparatus for recording data according to claim 1 where the speed reduction means comprises a train of gears including idler gears and a star wheel on a countershaft, and a lock arm pivoted on the base engaging the star wheel upon operation of the print-out operating means.

3. Apparatus for recording data according to claim 1 where the speed reduction means comprises a train of gears including idler gears on a countershaft, and the print-out mechanism includes a pair of rocker arms pivoted on the countershaft and print-out rollers on the rocker arms.

4. Apparatus for recording data according to claim 1 where the speed reduction means comprises a train of gears including idler gears on a countershaft, and the print-out mechanism includes pair of rocker arms pivoted on the countershaft and print-out rollers on the rocker arms, and the solenoid of the electrically controlled print-out operating means comprises an indexing solenoid on the base, the armature of the solenoid linked to the rocker arms.

5. Apparatus for recording data according to claim 1 where the speed reduction means comprises a train of gears including idler gears on a countershaft, and print-out mechanism includes a pair of rocker arms pivoted on the countershaft and print-out rollers on the rocker arms, the print-out rollers comprising a series of interconnected rollers, each engraved with outstanding type.

6. Apparatus for recording data according to claim 1 where the speed reduction means comprises a train of gears including idler gears on a countershaft, and the print-out mechanism includes a pair of rocker arms pivoted on the countershaft and print-out rollers on the rocker arms, the armature of the indexing solenoid linked to data recording means whereby said data recording means are indexed upon de-energizing of said solenoid.

7. Apparatus for recording data according to claim 1 where the base comprises an electric typewriter without its keyboard, the data recording means comprising a roll of paper on the platen and the platen.

8. Apparatus for recording data including a linearly wound transmitting potentiometer, a data servo motor, the data servo motor mechanically coupled to the transmitting potentiometer, a base, a print-out servo motor on the base, an exponentially wound receiving potentiometer on the base, speed reduction means mechanically coupling the moving arm of the receiving potentiometer to the print-out servo motor whereby the print-out servo motor drives the moving arm at reduced speed, a direct electrical coupling between the windings of the transmitting and the receiving potentiometers, a bias resistor in the circuit of the moving arm of the receiving potentiometer constituting electrical signal means, signal amplifying means electrically coupling the receiving potentiometer to the print-out servo motor whereby servo motor operation is responsive to moving arm position, the base including an electric typewriter without its keyboard, a platen and a roll of paper on the platen constituting data recording means, print-out mechanism including a series of interconnected rollers each engraved with outstanding type on rocker arms, a train of gears including gears on a countershaft connected to drive the print-out servo motor and the interconnected rollers, an indexing solenoid linking the base and the rocker arms, and linking the base and the platen, said indexing solenoid operable upon energizing to move the rocker arms and thereby register an impression from the print-out mechanism on to the roll of paper and operable upon de-energizing to index said platen, and timing means operable to periodically energize said indexing solenoid.

References Cited by the Examiner

UNITED STATES PATENTS

| | | | |
|---|---|---|---|
| 2,525,841 | 10/50 | Sturm et al. | 346—32 |
| 2,652,196 | 9/53 | Sterling | 235—61 |
| 2,912,163 | 11/59 | T. K. Van Tuyl. | |
| 2,960,910 | 11/60 | Pelavin | 346—32 |
| 2,973,238 | 2/61 | Herzog | 346—32 |
| 2,981,107 | 4/61 | Anderson | 346—32 X |
| 3,059,524 | 10/62 | Grassmann et al. | 88—14 |
| 3,120,420 | 2/64 | Gregory | 346—59 |

LEO SMILOW, *Primary Examiner.*

EMIL G. ANDERSON, *Examiner.*